United States Patent
Wasserman et al.

(10) Patent No.: US 7,388,153 B2
(45) Date of Patent: Jun. 17, 2008

(54) POLYPROPYLENE CABLE JACKET COMPOSITIONS WITH ENHANCED MELT STRENGTH AND PHYSICAL PROPERTIES

(75) Inventors: Scott H. Wasserman, Morganville, NJ (US); Geoffrey D. Brown, Bridgewater, NJ (US)

(73) Assignee: Union Carbide Chemicals and Plastics Technology LLC, Midland, MI (US)

( * ) Notice: Subject to any disclaimer, the term of this patent is extended or adjusted under 35 U.S.C. 154(b) by 76 days.

(21) Appl. No.: 10/527,221

(22) PCT Filed: Sep. 10, 2003

(86) PCT No.: PCT/US03/28491

§ 371 (c)(1),
(2), (4) Date: Mar. 10, 2005

(87) PCT Pub. No.: WO2004/025670

PCT Pub. Date: Mar. 25, 2004

(65) Prior Publication Data

US 2005/0241820 A1    Nov. 3, 2005

(51) Int. Cl.
*H01B 7/00* (2006.01)
(52) U.S. Cl. ............... 174/110 R; 174/120 R

(58) Field of Classification Search ........... 174/36, 174/110 R, 120 R, 120 AR, 120 SR
See application file for complete search history.

(56) References Cited

U.S. PATENT DOCUMENTS

| | | | | |
|---|---|---|---|---|
| 5,798,427 A | * | 8/1998 | Foster et al. | 526/352 |
| 5,852,143 A | * | 12/1998 | Sishta et al. | 526/127 |
| 6,251,995 B1 | * | 6/2001 | Hesse et al. | 525/191 |
| 6,441,308 B1 | * | 8/2002 | Gagnon | 174/105 R |
| 6,455,602 B1 | * | 9/2002 | Maki et al. | 521/136 |
| 6,594,427 B1 | * | 7/2003 | Dixon et al. | 385/109 |
| 2002/0121388 A1 | * | 9/2002 | Booth et al. | 174/110 R |
| 2003/0019655 A1 | * | 1/2003 | Gagnon | 174/105 R |
| 2003/0050401 A1 | * | 3/2003 | Jackson et al. | 525/191 |

FOREIGN PATENT DOCUMENTS

| | | | |
|---|---|---|---|
| EP | 1 038 889 A2 | * | 3/2000 |
| EP | 1 217 013 A2 | * | 6/2002 |
| EP | 1 295 910 A1 | * | 3/2003 |

* cited by examiner

*Primary Examiner*—William H. Mayo, III

(57) ABSTRACT

The present invention is a cable comprising one or more telecommunication or power transmission media or a core of two or more such media, each medium or core surrounded by at least one jacketing or sheathing layer comprising a polypropylene homopolymer or copolymer and having a relaxation spectrum (RSI) and melt flow (MF) such that RSI*MF^a is greater than about 12 when a is about 0.5.

9 Claims, 1 Drawing Sheet

Tube-On Cable Jacketing

Tube-On Cable Jacketing

POLYPROPYLENE CABLE JACKET COMPOSITIONS WITH ENHANCED MELT STRENGTH AND PHYSICAL PROPERTIES

FIELD OF THE INVENTION

This invention relates to telecommunication and power transmission cables. Specifically, this invention relates to polypropylene-based cable jackets.

DESCRIPTION OF THE PRIOR ART

Cables for telecommunications and power transmission applications generally comprise an outer jacket or sheath based on a thermoplastic polyolefin composition. Additional jacketing applications for thermoplastic polyolefin materials include inner jackets or sheaths. The jacketing materials often contain carbon black or other additives for UV resistance, thermal oxidative stability, extrusion benefit, or physical property modification. Polyolefin jacketing materials are categorized based upon a range of required and preferred application performance targets.

Desired requirements include flexibility vs. stiffness characteristics, cold bend and cold impact performances, toughness including abrasion, tear and cut-through resistance, environmental compatibility including environmental stress crack resistance (ESCR), weatherability (especially for outdoor sunlight exposures), thermo-oxidative stability, long term aging characteristics, heat deformation, and creep characteristics. For fiber optic cable applications, crush resistance and post-extrusion shrinkage are also important characteristics.

In addition to the proper balance of required physical properties, a key performance for polyolefin jacketing composition is the capability to be extruded at commercial-scale line-speed conditions without formation of holes or other melt-state instabilities and without the formation of a rough surface during the coating process. Therefore, jacketing materials need to have sufficient melt strength to avoid holes, tears, or other defects in the melt state during the extrusion fabrication process. A good blemish free and smooth jacketed cable appearance with accurate dimension control is also important. Adequate jacketing material melt strength is also important to bridge across core imperfections and thereby provide a finished jacketing with uniform surface appearance. Melt strength also contributes to good dimensional control by avoiding melt sag of the extruded jacket in the fabricating process prior to cooling.

U.S. Pat. No. 5,718,974 describes a cable jacketing made from specific polyethylene compositions. Most polyolefin jacketing compositions require balancing melt-state properties against a range of physical properties.

For example, in optic cable applications, typical polyethylene jacketing materials exhibit undesirably high post-extrusion shrinkage and lower than desired modulus and deformation resistance. Polypropylene materials (homopolymers and copolymers) would provide increased modulus and reduced post extrusion shrinkage. However, conventional polypropylene materials lack the melt strength needed for satisfactory performance in jacketing "tube-on" extrusion applications and conventional propylene homopolymers and random copolymers would typically show unsatisfactory cold impact performance for cable jacketing use.

In selected cable jacketing applications, the substantially increased melting temperature and heat deformation performance of polypropylenes would be an advantage. This includes applications such as installation of telecommunication cables in close proximity to steam lines, and power cable use where current overload conditions can overheat the cable.

Another application where polypropylenes would be advantageous is in cable applications that use polypropylene for an inner jacket and an ethylene-based polymer for an outer jacket. The advantage of this application is that the polypropylene-based inner jacket has a relatively higher melting point than the melting point of the ethylene-based outer jacket, thereby leading to a reduced tendency for the two jacketing layers to fuse during the subsequent melt extrusion application of the outer jacket.

However, the poor melt strength of polypropylene based compositions has limited the utilization of polypropylene for applications, such as these, despite these substantial advantages of polypropylene in other properties.

Therefore, for certain cable jacketing applications, it is desirable that polypropylene based compositions have the 1) increased melt strength needed for optimal performance in cable jacketing extrusion processes along with 2) required improvements in cold impact performance. These polypropylene compositions would be preferred for jacketing applications where other inherent polypropylene performance characteristics are desired for the most competitive performance balance. For example, these compositions would be preferred for fiber optic cable jacketing because they would provide substantially improved post extrusion shrinkage and deformation resistance characteristics versus conventional polypropylene compounds and incumbent polyethylene compounds.

SUMMARY OF THE INVENTION

The present invention is a cable comprising one or more telecommunication or power transmission media or a core of two or more such media, each medium or core surrounded by at least one jacketing or sheathing layer comprising a polypropylene homopolymer or copolymer and having a relaxation spectrum (RSI) and melt flow (MF) such that RSI*MF^a is greater than about 12 when a is about 0.5. Significantly, the jacketing or sheathing layer exhibits advantaged extrusion fabrication characteristics, resulting from the propylene polymer having enhanced rheology properties (as demonstrated by its high relaxation spectrum index (RSI)). Additionally, the propylene-based polymer composition of the present invention exhibits relatively high melt strength compared to compounds of conventional propylene polymers or ethylene polymers. In fiber optic cable jacketing applications, the present invention advantageously balances low post extrusion shrinkage with high modulus/deformation resistance.

DESCRIPTION OF THE INVENTION

Figure 1:
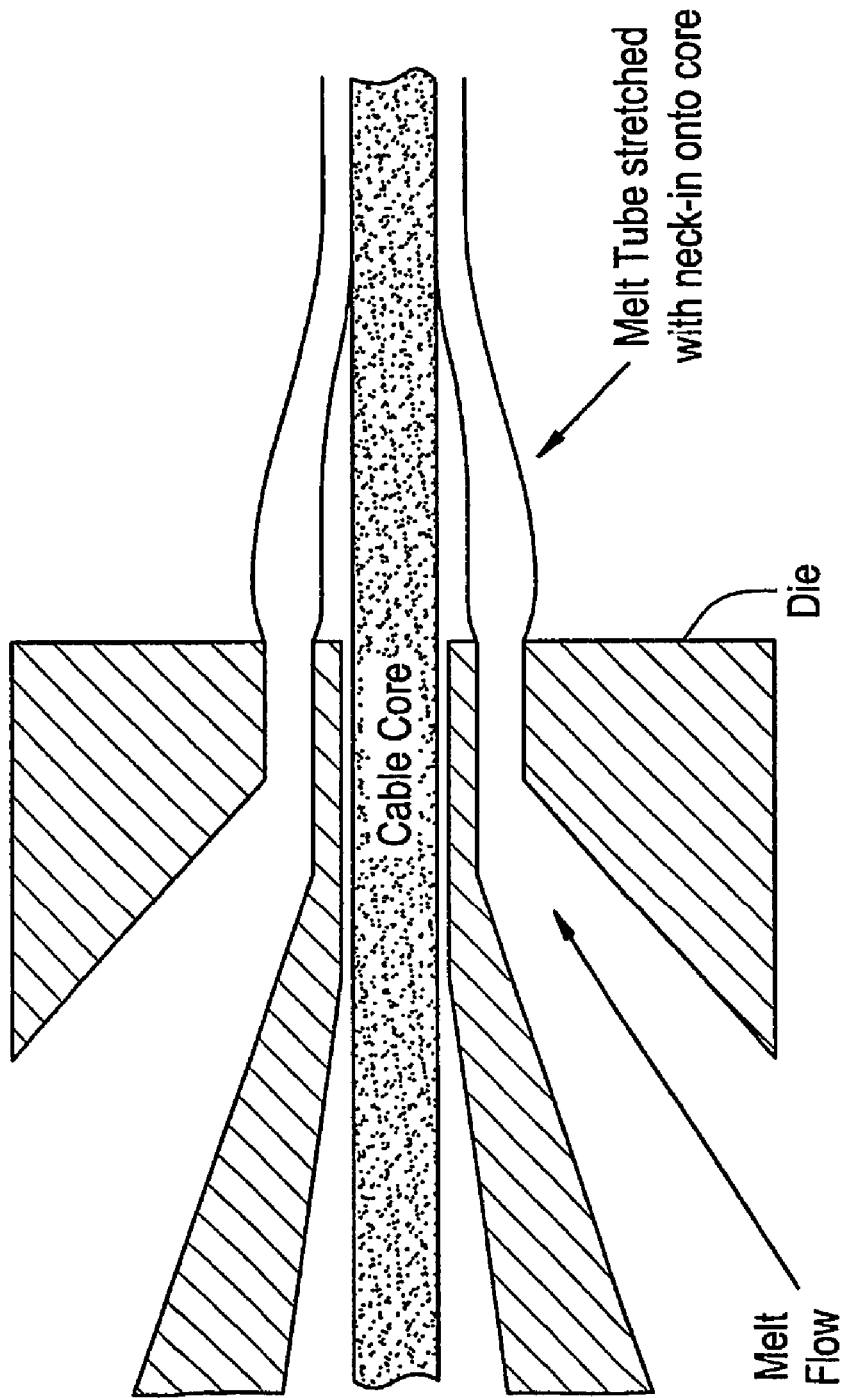
FIG. 1 shows the "tube-on" or "sleeving" process involved when stretching a melt tube exiting an extruder to neck in and provide a tight jacketing over the cable core.

The invented cable comprises one or more telecommunication or power transmission media or a core of two or more such media, each medium or core surrounded by at least one jacketing or sheathing layer comprising a polypropylene homopolymer or copolymer and having a relaxation spectrum (RSI) and melt flow (MF) such that RSI*MF^a is greater than about 12 when a is about 0.5.

As used herein, the following terms shall have the following meanings:

"Coupling agent" means a chemical compound that contains at least two reactive groups that are each capable of forming a carbene or nitrene group that are capable of inserting into the carbon hydrogen bonds of CH, CH2, or CH3 groups, both aliphatic and aromatic, of a polymer chain. The reactive groups can thereby couple separate polymer chains to yield a long chain branching structure. It may be necessary to activate a coupling agent with a chemical coagent or catalyst, or with heat, sonic energy, radiation or other chemical activating energy. Examples of coupling agents include diazo alkanes, geminally-substituted methylene groups, metallocarbenes, phosphazene azides, sulfonyl azides, formyl azides, and azides.

Preferred coupling agents are poly(sulfonyl)azides, including compounds such as 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis (sulfonyl azide), 1,6-bis(4'-sulfonazidophenyl)hexane, 2,7-naphthalene bis(sulfonyl azide), mixed sulfonyl azides of chlorinated aliphatic hydrocarbons containing an average of from 1 to 8 chlorine atoms and from 2 to 5 sulfonyl azide groups per molecule, and mixtures thereof. Preferred poly (sulfonyl azide)s include oxy-bis(4-sulfonylazidobenzene), 2,7-naphthalene bis(sulfonyl azido), 4,4'-bis(sulfonyl azido) biphenyl, 4,4'-diphenyl ether bis(sulfonyl azide) and bis(4-sulfonyl azidophenyl)methane, and mixtures thereof. See also WO 99/10424. Sulfonyl azides are commercially available or are conveniently prepared by the reaction of sodium azide with the corresponding sulfonyl chloride. Oxidation of sulfonyl hydrazines with various reagents (nitrous acid, dinitrogen tetroxide, nitrosonium tetrafluoroborate) has also been used.

When a bis(sulfonyl azide) is used, the amount is preferably at least about 100 parts per million ("ppm") based on the total weight of the propylene polymer. More preferably, the amount is at least about 150 ppm. Most preferably, the amount is at least about 200 ppm. For example, when a large change in extrusion and impact properties is desirable as compared with the base noncoupled impact propylene copolymer, an amount of at least about 300 ppm or 450 ppm is even more preferable.

"Extruders" include devices that (1) extrude pellets, (2) coat wires or cables, (3) form films, foams, profiles, or sheets, or (4) blow mold articles.

"Impact modified" propylene polymers incorporate an elastomeric component ("impact modifiers") by an in-reactor blend of a propylene polymer with an elastomeric component or by compounding an elastomeric component into the propylene polymer. In the former method, the propylene polymer and the elastomeric component are produced in one or more reactors of the same production process. Examples of suitable elastomer materials are EPR rubbers or ethylene-propylene fleximers. Preferably, the impact modifier is a copolymer of ethylene and propylene or other higher alpha-olefins, such as butene, 4-methyl-1-pentene, hexene, and octene. Optionally, the impact modifier may also contain at least one diene.

The preferred impact modified polypropylenes have at least about 5 weight percent elastomeric impact modifier constituent based on the total weight of polypropylene. More preferably, the elastomeric impact modifier constituent is at least about 9 weight percent. Most preferably, the impact modifier content is at least about 13 weight percent.

When the continuous phase of an impact propylene copolymer is a homopolymer propylene polymer and the elastomeric phase is comprised of a copolymer or terpolymer containing monomer units derived from ethylene, the impact propylene copolymer preferably contains at least about 5 weight percent, more preferably at least about 7 weight percent, most preferably at least about 9 weight percent -CH2CH2- units derived from ethylene monomer based on the total weight of the propylene phase. Preferably, such an impact propylene copolymer contains less than about 30 weight percent, more preferably less than about 25 weight percent, most preferably less than about 20 weight percent -CH2CH2- units derived from ethylene monomer based on the total weight of the propylene phase.

"Impact properties" refer to properties such as impact strength, which are measured by any means within the skill in the art. Examples of impact properties include (a) Izod impact energy as measured in accordance with ASTM D 256, (b) MTS Peak Impact Energy (dart impact) as measured in accordance with ASTM D 3763-93, and (c) MTS total Impact Energy as measured in accordance with ASTM D-3763. With regard to cold impact properties (i.e., properties at temperatures of −20 degrees C. or lower), the ductile-to-brittle transition temperature ("DBTT") is an important characteristic. DBTT defines the temperature at which an object transitions from a predominantly ductile mode of failure to a predominantly brittle mode of failure.

"Impact propylene copolymers" refer to heterophasic propylene copolymers where polypropylene or random copolymer polypropylenes are the continuous phase and an elastomeric phase is dispersed therein. The elastomeric phase may also contain crystalline regions, which are considered part of the elastomeric phase. The impact propylene copolymers are prepared by reactively incorporating the elastomeric phase into the continuous phase, such that they are a subset of impact modified propylene polymers. The impact propylene copolymers are formed in a dual or multi-stage process, which optionally involves a single reactor with at least two process stages taking place therein or multiple reactors. See E. P. Moore, Jr in *Polypropylene Handbook*, Hanser Publishers, 1996, page 220-221 and U.S. Pat. Nos. 3,893,989 and 4,113,802.

Optionally, the impact propylene copolymers may contain impact modifier to further enhance impact properties.

"Rheology properties" refer to the melt-state properties such as the elastic and viscous moduli, the relaxation spectrum or distribution of relaxation times, and the melt strength or melt tension which are measured by any means within the skill in the art. Deformation resistance typically correlates to the secant or flexural modulus properties, which are measured in accordance with ASTM D 638 or ASTM D 790, respectively.

"Shrinkage properties" refer to the properties of articles, such as cable jackets, which involve the presence, or lack thereof, of dimensional stability following the extrusion fabrication process. In wire and cable applications, shrinkage is generally measured parallel to the cable axis, that is, longitudinally, as the change in a specified length of cable jacketing or sheathing over time. Shrinkage is typically evaluated by performing a specified conditioning period in a controlled higher temperature environment and then measuring the change in the axial direction. Measurements can be done with the jacket or sheathing either on or off of a cable core.

As previously-noted, the invented cable comprises one or more telecommunication or power transmission media or a core of two or more such media, each medium or core surrounded by at least one jacketing or sheathing layer comprising a polypropylene homopolymer or copolymer and having a relaxation spectrum (RSI) and melt flow (MF) such that RSI*MF^a is greater than about 12 when a is about 0.5.

Based on the response of the polymer and the mechanics and geometry of the rheometer used, the relaxation modulus G(t) or the dynamic moduli G'( ) and G"( ) can be determined as functions of time t or frequency, respectively (See Dealy et al, Melt Rheology and Its Role in Plastics Processing, Van Nostrand Reinhold, 1990, pages 269 to 297). The mathematical connection between the dynamic and storage moduli is a Fourier transform integral relation, but one set of data can also be calculated from the other using the well known relaxation spectrum (See Wasserman, J. Rheology, Vol. 39, 1995, pages 601 to 625). Using a classical mechanical model, a discrete relaxation spectrum consisting of a series of relaxations or "modes", each with a characteristic intensity or "weight" and relaxation time, can be defined. Using such a spectrum, the moduli are re-expressed as:

$$G'(\omega) = \sum_{i=1}^{N} g_i \frac{(\omega \lambda_i)^2}{1 + (\omega \lambda_i)^2}$$

$$G''(\omega) = \sum_{i=1}^{N} g_i \frac{\omega \lambda_i}{1 + (\omega \lambda_i)^2}$$

$$G(t) = \sum_{i=1}^{N} g_i \exp(-t/\lambda_i)$$

where N is the number of modes and gi and i are the weight and time for each of the modes (See Ferry, Viscoelastic Properties of Polymers, John Wiley & Sons, 1980, pages 224 to 263). A relaxation spectrum may be defined for the polymer using software such as IRIS™ rheology software, which is commercially available from IRIS™ Development. Once the distribution of modes in the relaxation spectrum is calculated, the first and second moments of the distribution, which are analogous to Mn and Mw, the first and second moments of the molecular weight distribution, are calculated as follows:

$$g_I = \sum_{i=1}^{N} g_i \Big/ \sum_{i=1}^{N} g_i/\lambda_i$$

$$g_{II} = \sum_{i=1}^{N} g_i \lambda_i \Big/ \sum_{i=1}^{N} g_i$$

RSI is defined as gII/gI. Further, nRSI is calculated from RSI as described in U.S. Pat. No. 5,998,558, according to nRSI=RSI*MFR^a where MFR is the polypropylene melt flow rate as measured using the ASTM D-1238 procedure at 230° C. and 2.16 KG weight, and a is approximately 0.5. The nRSI is effectively the RSI normalized to an MFR of 1.0, which allows comparison of rheology data for polymeric materials of varying melt flow rates. RSI and nRSI are sensitive to such parameters as a polymer's molecular weight distribution, molecular weight, and features such as long-chain branching and crosslinking. The higher the value of nRSI, the broader the relaxation time distribution.

Propylene polymers useful in the present invention may be made using Ziegler-Natta catalyst, constrained geometry catalyst, metallocene catalyst, or any other suitable catalyst system.

Preferentially, the propylene polymers of the present invention are coupled, which coupling can be achieved in several ways. The coupling can be carried out during the polypropylene polymerization process via specialized catalyst, co-reactive agents, and other means known to one of ordinary skill in the art. Alternatively, the coupling can be carried out in post polymerization steps. Examples of suitable post-polymerization steps include coupling the polymers in an extruder using a coupling agent or treating the propylene polymers in an e-beam process.

Melt flow rate is an important feature to consider when selecting the base noncoupled propylene polymer for coupling. It is important to yield a coupled polymer with sufficient melt flow rate for processing.

Furthermore, the coupled polymer may be blended with other propylene polymers, including homopolymer propylene polymers, random propylene copolymers and other impact propylene polymers, or other polyolefins to make thermoplastic olefins (TPO's) or thermoplastic elastomers (TPE's). Optionally, the other propylene polymers or polyolefins may be coupled with coupling agents.

It is possible to quantify the effect of coupling on the long-relaxation time behavior of the polymer by using the relaxation spectrum index (RSI). The RSI represents the breadth of the relaxation time distribution, or relaxation spectrum.

In one embodiment of the present invention, the polypropylene resins have sufficient coupling to provide an absolute RSI value of at least about 12. More preferably, a RSI of at least about 15 is desired. Even more preferably, the RSI is of at least about 18, and in some instances, the RSI is most preferably at least about 20.

In a preferred embodiment of the current invention, the coupling agent is added to produce a coupled polypropylene homopolymer or copolymer, having an RSI preferably at least about 1.3 times that of a comparable noncoupled propylene polymer. More preferably, the RSI at least about 1.5 times. A comparable noncoupled propylene polymer is the base polymer used to make the coupled propylene polymer.

In a more preferred embodiment, coupling of an impact modified propylene-based polymer increases the melt strength of the polymer. Typically the impact properties of the resulting cable jacket are also enhanced as compared to those properties of a cable jacket comprising a comparable noncoupled impact modified propylene-based polymer. Preferably, the coupled impact modified propylene polymer resins have a melt strength of at least about 8 centiNewtons, more preferably a melt strength of at least about 15 cN, and most preferably a melt strength of at least about 30 cN.

Alternatively, the invention can be characterized by the following formula:

Y≧1.25, in which

Y=the ratio of the melt strength of the coupled propylene resin compared to the melt strength of the comparable noncoupled polypropylene. Preferably, in this aspect, Y is at least about 1.5; more preferably, Y is at least about 2; most preferably, Y is at least about 5.

The impact modification can be achieved by the use of impact propylene copolymers or by melt mixing of a wide range of elastomeric materials into the propylene polymer, either before or after coupling is accomplished. A combination of coupled impact-modified propylene polymer, for example, with an elastomeric component can also be used.

The propylene-based polymer composition preferably is impact modified to provide the cold impact performance needed for most cable jacketing applications. Preferably, the propylene polymer composition exhibits a DBTT of less than $-5°$ C., more preferably less than $-10°$ C., further more preferably less than $-15°$ C., most preferably less than $-20°$ C.

Additionally, the articles made from the compositions and tested in accordance with ASTM D 256 preferably exhibit an IZOD impact strength of at least 0.7 ft-lb/in, more preferably at least 1.5 ft-lb/in, most preferably at least 2.0 ft-lb/in. Further, the propylene-based polymer compositions preferably will exhibit a 2 percent secant modulus of at least 90,000 pounds per square inch (psi), more preferably at least 100,000 psi, further more preferably at least 110,000 psi, most preferably at least 120,000 psi when tested in accordance with ASTM D 638. Finally, jackets made from the propylene-based polymer composition of the invention preferably exhibit post extrusion shrinkage of less than about 2.7 percent, more preferably less than about 2.5 percent, further more preferably less than about 2.3 percent and most preferably less than about 2.0 percent shrinkage measured along the longitudinal axis.

Impact properties for the coupled propylene polymers comprising the present invention are typically enhanced versus comparable conventional propylene polymers. Furthermore, cable jackets formed from the coupled propylene resins of the present invention advantageously maintain the high modulus and deformation characteristics, for example, as measured by flexural or secant modulus, of the comparable cable jackets formed from non-coupled versions of the same propylene polymers.

The jacketing and/or sheathing layers can be either foamed or non-foamed. In one particular preferred embodiment, the cable is comprised of an inner jacketing or sheathing layer and an outer jacketing or sheathing layer. Preferably, the inner jacketing or sheathing layer is foamed. Also preferably, the inner jacketing or sheathing layer is comprised of a propylene-based polymer while the outer jacketing or sheathing layer is comprised of an ethylene-based polymer The propylene polymer compositions can also contain non-halogenated or halogenated flame retardant additives. Suitable non-halogenated flame retardant additives include metal hydrates, red phosphorus, silica, alumina, titanium oxides, talc, clay, organo-modified clay, zinc borate, antimony trioxide, wollastonite, mica, silicone polymers, phosphate esters, hindered amine stabilizers, ammonium octamolybdate, intumescent compounds, and expandable graphite. Suitable halogenated flame retardant additives include decabromodiphenyl oxide, decabromodiphenyl ethane, ethylene-bis(tetrabromophthalimide), and 1,4:7,10-Dimethanodibenzo(a,e)cyclooctene, 1,2,3,4,7,8,9,10,13,13,14,14-dodecachloro-1,4,4a,5,6,7,10,10a,11,12,12a-dodecahydro-).

The propylene polymer compositions of the present invention can also contain fillers such as calcium carbonate. Additionally, nucleating agents may be utilized. These nucleating agents can increase the rate at which the resins crystallize and enhance the physical properties. However, in some instances, the presence of a nucleating agent in a coupled impact propylene copolymer, may reduce the balance of the impact and toughness properties of a cable jacket formed from the coupled impact propylene copolymer. NA-11, which is available from Asahi Denka Corporation, is an example of a useful nucleating agent. In addition, the composition may contain other additives such as antioxidants, stabilizers, blowing agents, carbon black, pigments, processing aids, peroxides, cure boosters, and surface active agents to treat fillers may be present.

A comparison of key jacketing performance requirements for compositions based on polyethylene, conventional propylene-based polymer (Category I), and coupled propylene-based polymer (Category II) is provided as Table 1 below. A third category (Category III) comprises coupled propylene-based polymer compositions that include an additional elastomeric component. The Category III compositions demonstrate the effect of adding additional elastomer to the composition after coupling the propylene-based polymer.

Performance in each key property category are qualitatively ranked from unacceptable (--, -), to acceptable but not preferred (0), to advantaged (+, ++), and to very advantaged (+++, ++++) for the various material options shown. This matrix illustrates the overall advantage provided by high-melt-strength polypropylene compositions for certain jacketing applications.

TABLE 1

Comparison of Jacketing Performances

| Desired Jacketing Property | Polyethylene | | Conventional Polypropylene | | | High Melt Strength Polypropylene | | | High Melt Strength Polypropylene with Additional Impact Modifier | | |
|---|---|---|---|---|---|---|---|---|---|---|---|
| | LLDPE | HDPE | Homo- | Random | Impact | Homo- | Random | Impact | Homo- | Random | Impact |
| Low Post Extrusion Shrinkage | - | 0 | ++++ | +++ | +++ | +++ | ++ | ++ | ++ | + | + |
| High Modulus/Deformation Resistance | -- | 0 | +++ | + | ++ | +++ | + | ++ | ++ | 0 | + |
| Good Low Temperature Impact | ++++ | ++ | -- | - | + | - | 0 | ++ | + | ++ | +++ |
| Heat Deformation/Melt Point above 130 degrees C. | -- | - | ++ | + | ++ | ++ | + | ++ | ++ | + | ++ |
| Extrudability/Melt Strength | + | + | - | - | - | ++ | ++ | ++ | ++ | ++ | ++ |

EXAMPLES

The following non-limiting examples illustrate the invention.

Comparative Examples 1-5 and Examples 6-12

The following propylene polymers were used to prepare the exemplified compositions: (a) C105-02 impact propylene copolymer; (b) D111.00 impact propylene copolymer; (c) C104-01 impact propylene copolymer; (d) C107-04 impact propylene copolymer; (e) 6D20 random propylene copolymer. Also, the following jacketing compositions were evaluated in the examples: (a) DGDD-6059 jacketing compound and (b) DBDA-6318 jacketing compound. Each propylene polymer and jacketing compound is available from The Dow Chemical Company.

C105-02 is a high impact propylene copolymer, having a melt flow rate of 1.5 g/10 min and an ethylene content of 16 wt percent. D111.00 is a medium impact propylene copolymer, having a melt flow rate of 0.8 g/10 min and an ethylene content of 9 wt percent. C104-01 is a medium impact propylene copolymer, having a melt flow rate of 1.1 g/10 min and an ethylene content of 9 wt percent. C107-04 is a medium impact propylene copolymer, having a melt flow rate of 4.0 g/10 min and an ethylene content of 9 wt percent. 6D20 is a random propylene copolymer, having a melt flow rate of 1.8 g/10 min. Comparative Examples 1-5 were prepared with C105-02, D111.00, C104-01, C107-04, and 6D20 respectively.

One or more of the exemplified compositions were prepared using 4,4'-oxy-bis-(sulfonylazido)benzene ("DPO-BSA") as a coupling agent. Some of the exemplified compositions also contained Irganox 1010™ tetrakis [methylene (3,5-di-tert-butyl-4-hydroxyhydro-cinnamate)]methane, Irgafos 168™ tris(2,4-ditert-butylphenyl)phosphite, and FX 5911X™ processing aid. Irganox 1010 and Irgafos 168 are available from Ciba Specialty Chemicals Inc. FX-5911X is an HFP/VDF/TFE polymer, which is available from Dyneon LLC, a wholly owned subsidiary of 3M Corporation.

As described below, the coupling agent was also prepared as a masterbatch in Affinity EG-8200™ polyethylene or Profax 6501 polypropylene. Affinity EG-8200™ polyethylene is an ethylene/octene copolymer with a melt index of 5.0 grams/10 minutes and a density 0.87 grams/cubic centimeter, which is available from The Dow Chemical Company. Profax 6501 is propylene homopolymer, having a melt flow rate of 4 g/10 min, and available from Montell USA, Inc.

DPO-BSA Master Batch 1 was prepared in Affinity EG-8200™ polyethylene to yield 5 weight percent concentrate. DPO-BSA Master Batch 2 was prepared in Profax 6501 such that when 5 weight percent of the masterbatch was added to a composition, the masterbatch provided a 200-ppm amount of DPO-BSA. DPO-BSA Master Batch 3 was prepared in Profax 6501 such that when 0.9 weight percent of the masterbatch was added to a composition, the masterbatch provided a 180-ppm amount of DPO-BSA. DPO-BSA Master Batch 4 was prepared in Profax 6501 such that when 2 weight percent of the masterbatch was added to a composition, the masterbatch provided a 200-ppm amount of DPO-BSA.

For Examples 6, 7, and 9, the exemplified compositions were extruded through an 11-barrell Werner & Pfleiderer ZSK40 twin screw extruder at a feed rate of 250 lbs/hr, a screw speed of 300 rpm, and a target temperature profile of 180/190/200/200/210/220/230/240/230/240/240 degrees C. (from feed inlet to die). For Example 8, the mixture was extruded through a 9-barrell Werner & Pfleiderer ZSK92 mm twin screw extruder at a feed rate of 2900 lbs/hour, a screw speed of 400 rpm, and a target temperature profile of 25/25/25/200/200/240/240/240 degrees C. (from feed inlet to die).

For Example 10, the mixture was extruded at conditions typical of processing a 0.8 melt flow rate impact copolymer. For Example 11, the mixture was extruded at conditions typical of processing a 1.2 melt flow rate impact copolymer. For Example 12, the mixture was extruded through a 9-barrell Century ZSK40 twin screw extruder at a feed rate of 130 lbs/hr, a screw speed of 220 rpm, and a target temperature profile of 80/80/200/220/230/240/240/240 degrees C. (from feed inlet to die).

When a master batch of DPO-BSA was used for an Example, the masterbatch was fed simultaneously with the propylene polymer and the other additives into the feed hopper of the extruder.

In the following Table 2, the symbol "(d)" indicates that the DPO-BSA was added via direct addition rather than via a masterbatch. If a masterbatch was used, the corresponding box was filled with a "Y".

TABLE 2

| Component | C-1 | C-2 | C-3 | C-4 | C-5 | Ex. 6 | Ex. 7 | Ex. 8 | Ex. 9 | Ex. 10 | Ex. 11 | Ex. 12 |
|---|---|---|---|---|---|---|---|---|---|---|---|---|
| C105-02 | Y | | | | | Y | Y | Y | | | | |
| D111.00 | | Y | | | | | | | Y | Y | | |
| C104-01 | | | Y | | | | | | | | Y | |
| C107-04 | | | | Y | | | | | | | | Y |
| 6D20 | | | | | Y | | | | | | | |
| DPO-BSA (ppm) | | | | | | 450 (d) | 200 | 180 | 200 | 150 (d) | 200 (d) | 200 |
| DPO-BSA (MB-1) | | | | | | | | | Y | | | |
| DPO-BSA (MB-2) | | | | | | | Y | | | | | |
| DPO-BSA (MB-3) | | | | | | | | Y | | | | |
| DPO-BSA (MB-4) | | | | | | | | | | | | Y |
| Mineral Oil (ppm) | | | | | | 2000 | | | | | | |
| Irganox 1010 (ppm) | | | | | | 1000 | 1000 | 1500 | | 600 | 2300 | 1000 |
| Irgafos 168 (ppm) | | | | | | 1000 | 1000 | 1000 | | 600 | 600 | 1000 |
| FX-5911X | | | | | | | | 300 | | | | |
| Calcium stearate | | | | | | | | | | 500 | 500 | |

Tables 3 and 4 report the notched Izod values for Comparative Examples 1 and 2 and Examples 6, 7, and 9. Each notched Izod was measured following ASTM Method D-256 as described in Section 8: Plastics 1997. The edge-gated plaques were injection molded. The required test samples were cut parallel and perpendicular to the polymer injection flow direction. After notching, samples were tested with the orientation of the notch respectively perpendicular and parallel to the polymer injection flow direction. A ductile break is indicated with "(b)" following the reported value.

TABLE 3

Perpendicular Notched Izod With Notch Perpendicular to Flow (J/m)

| Temp. (° C.) | Comp. Ex. 1 | Ex. 6 | Ex. 7 | Comp. Ex. 2 | Ex. 9 |
|---|---|---|---|---|---|
| 20 | 801 (b) | | | | |
| 15 | 694 (b) | | | | |
| 10 | 534 (b) | | | 368 (b) | |
| 5 | 160 | | | 342 (b) | |
| 0 | 160 | 587 (b) | 747 (b) | 171 | 641 (b) |
| −5 | 160 | | 187 | 85 | 502 (b) |
| −10 | 107 | 641 (b) | 171 | 91 | 379 (b) |
| −15 | 53 | 214 | | | |
| −20 | 53 | 214 | 112 | 96 | 240 (b) |
| −25 | | | | | 75 |

TABLE 4

Parallel Notched Izod With Notch Parallel to Flow (J/m)

| Temp. (° C.) | Comp. Ex. 1 | Ex. 6 | Ex. 7 | Comp. Ex. 2 | Ex. 9 |
|---|---|---|---|---|---|
| 23 | | | | 235 | |
| 20 | 587 (b) | | | | |
| 15 | 214 | | | 176 | |
| 10 | 214 | | 336 (b) | 160 | |
| 5 | 107 | | 208 | 117 | |
| 0 | 107 | 587 (b) | 149 | 85 | 550 (b) |
| −5 | | | | | 240 (b) |
| −10 | | 480 (b) | 112 | 75 | 117 |
| −15 | | 160 | | | |
| −20 | | 107 | 101 | 75 | 96 |

Melt flow rate (MFR) for Comparative Examples 1-5 and Examples 6-12 was measured at 230° C. with a 2.16-kg weight according to the method of ASTM D1238.

Rheology measurements were done via dynamic oscillatory shear (DOS) experiments conducted with the controlled rate Weissenberg Rheogoniometer, commercially available from TA Instruments. Standard DOS experiments were run in parallel plate mode under a nitrogen atmosphere at 200 or 230 degrees C. Sample sizes ranged from approximately 1100 to 1500 microns in thickness and were 4 centimeters in diameter. DOS frequency sweep experiments covered a frequency range of 0.1 to 100 sec-1 with a 2 percent strain amplitude. The TA Instruments rheometer control software converted the torque response to dynamic moduli and dynamic viscosity data at each frequency. Discrete relaxation spectra were fit to the dynamic moduli data for each sample using the IRIS™ commercial software package, followed by the calculation of RSI values as described earlier.

Melt strength for all the samples was measured by using a capillary rheometer fitted with a 2.1-mm diameter, 20:1 die with an entrance angle of approximately 45 degrees. After equilibrating the samples at 190° C. for 10 minutes, the piston was run at a speed of 1 inch/minute. The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength.

TABLE 5

Melt Flow Rate, Rheology Values, and Melt Strength

| Property | C. 1 | Ex. 6 | Ex. 7 | Ex. 8 | C. 2 | Ex. 9 | Ex. 10 | C. 3 | Ex. 11 | C. 4 | Ex. 12 | C. 5 |
|---|---|---|---|---|---|---|---|---|---|---|---|---|
| MFR | 1.5 | | | 1.0 | 0.8 | | 0.3 | 1.1 | 0.5 | 4.0 | 3.6 | 1.8 |
| RSI | | | | 20.1 | | | 42.1 | 8.7 | | 5.0 | 14.5 | 8.6 |
| nRSI | | | | 20.1 | | | 23.1 | 9.1 | | 10.0 | 27.5 | 11.5 |
| Melt strength (centiNewtons) | 5 | 64 | 8 | | 7.9 | 70 | | | | | | |
| Y | | 12.8 | 1.6 | | | 8.9 | | | | | | |

Comparative Examples 13 and 14 and Example 15

Comparative Example 13 was prepared using DGDD-6059 jacketing composition. DGDD-6059 is a 0.932 grams/cubic centimeter density composition made from a base ethylene/butene copolymer having a density of 0.921 grams/cubic centimeter mixed with about 2.5 wt percent carbon black.

Comparative Example 14 was prepared using DBDA-6318 jacketing composition. DBDA-6318 is a 0.954 grams/cubic centimeter density composition made from a base resin having (1) about 90 wt percent ethylene/hexene copolymer having a density of 0.945 grams/cubic centimeter and (2) about 10 wt percent ethylene/butene copolymer having a density of 0.921 grams/cubic centimeter mixed with about 2.5 wt percent carbon black.

Example 15 was prepared using a coupled impact modified propylene polymer, having a melt flow rate of 1.0 grams/10 minutes. The exemplified high melt strength impact modified propylene polymer composition contained an amount of carbon black comparable to the amount present in the DGDD-6059 and DGDA-6318 compositions.

Table 6 shows performance data for a conventional LLDPE (Comparative Example 13), a low-shrink HDPE (Comparative Example 14), and a coupled impact modified propylene polymer (Example 15).

The post extrusion shrinkage modeled extrusion of 0.124 inch outside diameter specimen on 14-gauge wire (0.064 inch) metallic conductor. The specimens were aged 24 hours at room temperature and removed from the conductor. The shrinkage was measured after aging at 100° C. for 24 hours.

TABLE 6

Post Extrusion Shrinkage and Secant Modulus

| Property | Comp. Ex. 13 | Comp. Ex. 14 | Example 15 |
|---|---|---|---|
| Polyethylene Melt Index | 0.8 | 0.8 | |
| PP Melt Flow Rate | | | 1.0 |
| Post Extrusion Shrinkage (%) | 3.34 | 2.98 | 1.71 |
| Secant Modulus (psi) | 42,000 | 90,000 | 130,000 |

What is claimed is:

1. A cable comprising one or more telecommunication or power transmission media or a core of two or more such media, each medium or core surrounded by at least one jacketing or sheathing layer comprising a polypropylene having a relaxation spectrum (RSI) and melt flow (NE) such that RSI*MF^a is greater than about 12 when a is about 0.5.

2. The cable of claim 1 wherein the polypropylene being coupled.

3. The cable of claim 2 wherein the coupled polypropylene being characterized by the following formula Y>1.25, wherein:

Y=a ratio of a melt strength of the coupled polypropylene to the melt strength of the comparable noncoupled polypropylene.

4. The cable of claim 1 wherein the polypropylene is an impact modified propylene copolymer.

5. The cable of claim 4 wherein the impact modified propylene copolymer comprises a continuous phase and an elastomeric phase, wherein the elastomeric phase being present in an amount of at least about 9 weight percent of the impact modified propylene copolymer.

6. The cable of claim 1 wherein the polypropylene being a foamed propylene-based polymer.

7. A cable comprising an inner jacketing or sheathing layer characterized according to any one of claims 1-6 and an outer layer comprising an ethylene polymer.

8. A cable comprising one or more telecommunication or power transmission media or a core of two or more such media, each medium or core surrounded by at least one jacketing or sheathing layer comprising a coupled impact modified propylene copolymer being characterized by the following formula Y≧1.25, wherein:

Y=a ratio of a melt strength of the coupled polypropylene to the melt strength of the comparable noncoupled polypropylene,
   comprising a continuous phase and an elastomeric phase, wherein the elastomeric phase being present in an amount of at least about 9 weight percent of the impact modified propylene copolymer,
   and the propylene copolymer having a relaxation spectrum (RSI) and melt flow (MF) such that RSI*MF^a is greater than about 12 when a is about 0.5.

9. A cable comprising one or more telecommunication or power transmission media or a core of two or more such media, each medium or core surrounded by at least one jacketing or sheathing layer comprising a polypropylene homopolymer or copolymer having a melt strength greater then about 8 centiNewtons.

* * * * *